Nov. 19, 1929.  W. A. TOLIVER  1,736,680
CHANGEABLE SPEED TRANSMISSION GEAR ATTACHMENT FOR CYCLES
Filed June 15, 1927  2 Sheets-Sheet 1
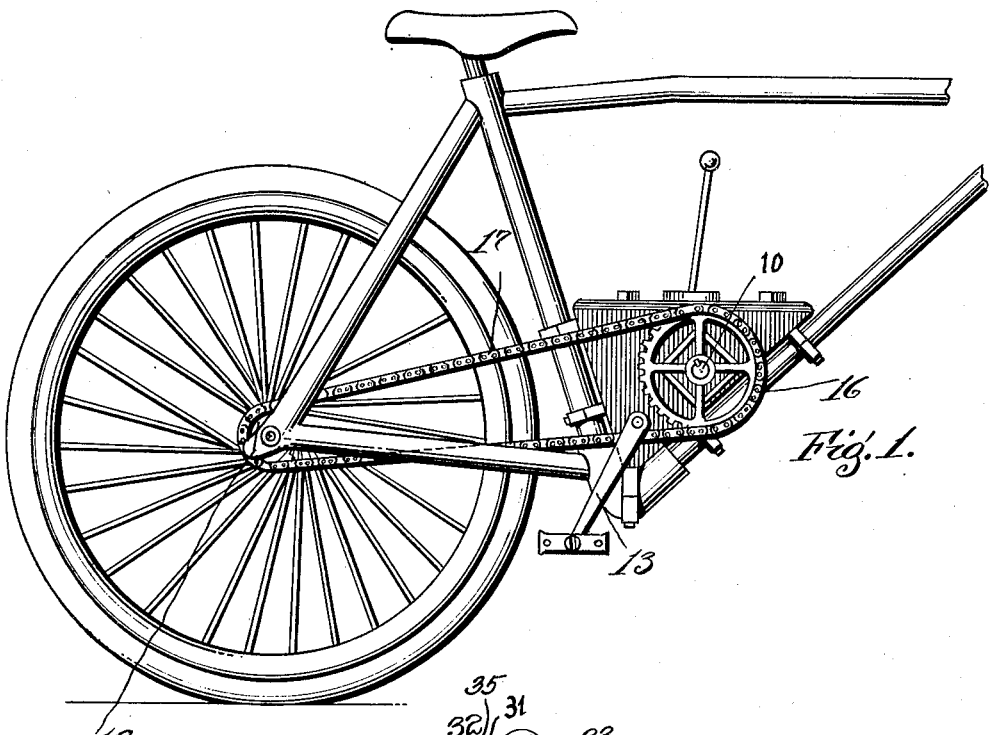
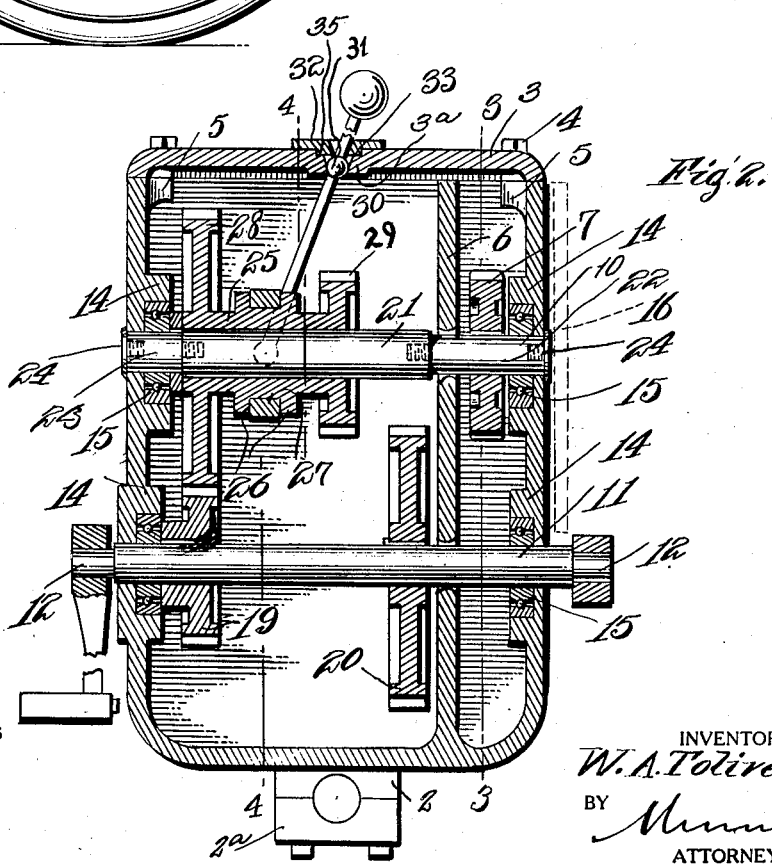
INVENTOR
W. A. Toliver

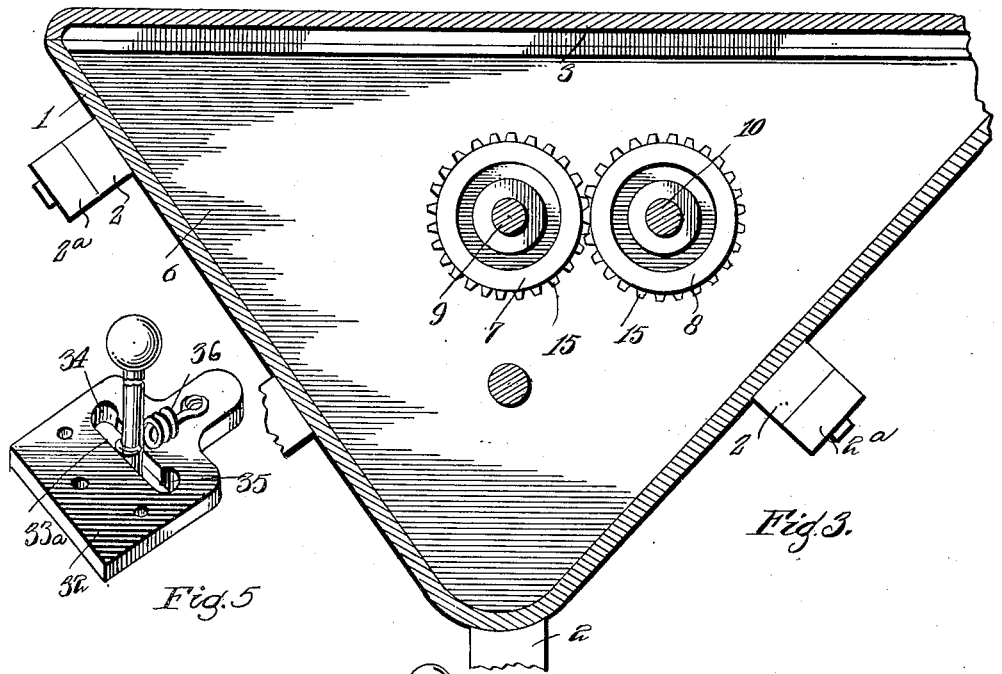
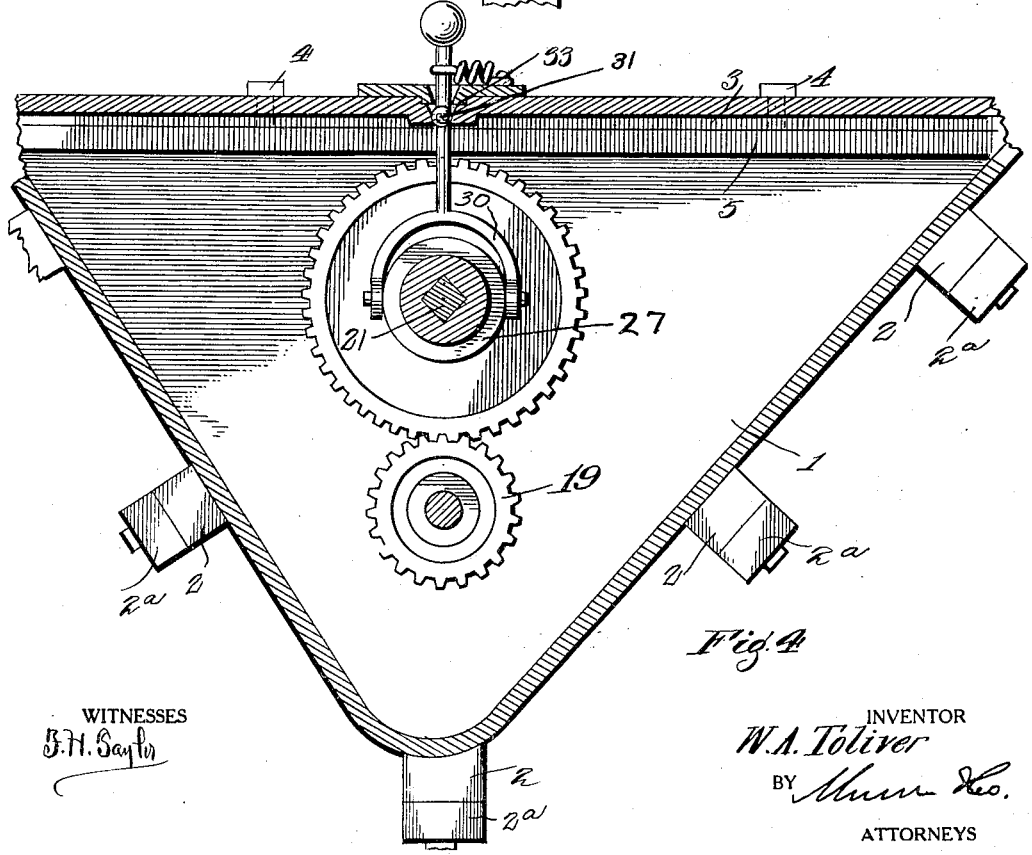

Patented Nov. 19, 1929

1,736,680

UNITED STATES PATENT OFFICE

WILLIAM A. TOLIVER, OF CHATTANOOGA, TENNESSEE

CHANGEABLE-SPEED TRANSMISSION-GEAR ATTACHMENT FOR CYCLES

Application filed June 15, 1927. Serial No. 198,986.

This invention relates to multi-speed transmission gearing for bicycles and the like and is more particularly concerned with a novel and advantageous construction of a self contained nature adapted for attachment to a standard bicycle without frame changes.

Changeable speed transmissions for bicycles as previously constructed or proposed have had the disadvantage of requiring special framing supports making them impractical for use upon the standard cycle, or have been handicapped by exposed gearing and lack of facilities for lubrication.

These disadvantages, I have obviated by the present invention and this feature as well as novel constructions and arrangements of parts will be more clearly seen from the following detailed specification when read in connection with the accompanying drawings forming part thereof, and in which:

Figure 1 is a view in elevation of a portion of a standard bicycle with standard frame having the multi-speed transmission gear attachment of the present invention mounted thereon, Figure 2 is a vertical section through the gear case taken on the centers of the vertically alined drive and counter shafts, Figure 3 is a vertical sectional view taken on the line 3—3 of Figure 2 and showing the relation of the drive, counter and sprocket shafts in the gear case, Figure 4 is a similar sectional view on the line 4—4 of Figure 2, but looking in the reverse direction and showing the mounting of the unitary sliding gears on the counter shaft and their shift lever connection, Figure 5 is a detail perspective of the plate secured to the top of the gear case showing the upper end of the shift lever and the means for retaining same in gear shifted positions.

As a preliminary to a detailed description of the mechanism shown in the drawings, it should be stated that in considering the efficiency of any multi-speed transmission attachment of this character, the matter of adequate lubrication and bearings are important factors in making such a device practical and successful. These points in addition to that of the adaptability of standard constructions have been taken into consideration in the construction provided by the present invention.

Referring to the drawings: The changeable speed gearing of the present invention is housed in a gear case 1 of shape to fit the lower portion of the central framing of a cycle and herein shown as approximately triangular. This gear case is provided at its base and sides with lugs 2, preferably cast integral therewith and shaped, as shown in Figure 2, to fit the bars of the frame. These lugs may be tapped and separate removable similarly shaped lugs 2ª having alined bolt holes therein may embrace the opposite sides of the frame bars and clamps the case to the frame by bolts inserted in the tapped bores in the case lugs as shown in Figures 1 and 2.

The case 1 is provided with a top plate 3 completely closing the case and removably secured thereto by bolts 4 inserted through the top into bores in internal flanges 5 formed on the interior of the case at opposite sides as seen in Figures 2 and 4. At one side of the case, a partition plate or webbing 6 is provided within which the permanently intermeshing gears 7 and 8 on a counter shaft 9 and sprocket shaft 10, respectively, are housed. Below the counter shaft 9 is a pedal shaft 11 whose ends project from opposite sides of the case and are reduced as at 12 to receive the arms 13 of the cycle pedals. The casing at opposite sides and adjacent to the ends of the pedal and counter shafts 11 and 9 is enlarged to form bosses 14 inclosing and housing ball bearings 15 for the ends of these shafts. The web or partition plate 6 and the adjacent case side are provided with suitable bearings for the sprocket wheel shaft 10, (Figures 1 and 3) one end of which extends out beyond the casing to receive the toothed sprocket wheel 16 of the cycle connected by the usual linked chain to the small sprocket 18 on the driven wheel of the cycle.

On the pedal shaft 11 in spaced relation are keyed gears 19 and 20, the latter being of twice the size and having twice the number of teeth as the former. The counter shaft 9 positioned above and in parallel with the pedal shaft has an intermediate squared section 21 and rounded end sections 22 and 23.

To facilitate insertion and removal of the counter shaft from the gear box, the end sections 22 and 23 may be tapped into the intermediate squared section 21 and be held within the gear box by cap screws 24 in their ends.

Mounted on the squared section 21 to rotate therewith and for longitudinal sliding movement thereon is a sleeve 25 grooved to provide spaced flanges 26 between which a yoke ring 27 is mounted. At the opposite ends of the sleeve, gears 28 and 29 are integrally formed, and are preferably of the same approximate size as the gears 20 and 19, respectively, with which they are designed to mesh but oppositely disposed so that in one position of the sleeve 25 the larger gear 28 on the counter shaft will mesh with the small gear 19 on the pedal shaft and upon the sleeve being shifted, the small gear 29 on the counter shaft meshing with the large gear 20 on the pedal shaft. This last position of engagement marks high speed transmission to the counter shaft from the pedal shaft and the first mentioned gears 28 and 19 when intermeshed, transmit low speed to the counter shaft.

This sliding movement of sleeve 25 to effect the high and low speed transmission from the pedal shaft is effected by means of a shift lever having at its lower end, a yoke 30 embracing and pivoted to the ring 27, this lever having a ball pivot 31 seating loosely in a round socket formed in an internal boss 3ª on the cover 3, the sides of which socket flare outwardly and upwardly. A shift lever detent plate 32 is removably seated over the ball socket with an apertured boss 33 extending into the recess 3ᵇ above the socket and acting to retain the ball 31 therein. The upper shank of the shift lever extends upwardly through an elongated slot formed in the detent plate, this slot having a straight central portion 33ª representing "neutral" position of the lever and end notches 34 and 35 representing the "high" and "low" speed shifted positions of the lever. A coiled spring 36 connected to the plate and lever at its opposite ends normally tends to hold the lever in "neutral" or in either of the "high" or "low" notches, the sides of which act also in conjunction with the spring to firmly retain the lever in its shifted positions. To facilitate removal of the cover plate 3, the upper portion and ball of the lever may be unitary and the lower portion or shank within the gear case may thread, as shown in dotted lines in Figure 2, into the ball so that when the detent plate is removed, the lever may be unscrewed and the cover 3 removed.

Motion transmitted to the counter shaft from the pedal shaft is transmitted in turn to the sprocket shaft through the permanently meshing gears 7 and 8 heretofore described and thence through the sprocket wheel and chain to the small sprocket gear on the rear wheel of the cycle. In shifting from "low" to "high" speed or vice versa, the rider merely releases pressure on the pedals temporarily before moving the shift lever. The ratio of speed transmitted may be varied as desired by using gears of varying sizes and number of teeth.

The invention described herein provides a complete self contained transmission entirely enclosed and fully lubricated since the gear case is filled with suitable lubricant and all wearing parts run in a bath of lubricant. The gear case is adapted for use with present cycle frames without change and can be installed by the manufacturer as original equipment or by the user, the pedals, pedal shaft and sprocket simply being removed and the transmission case with its sprocket wheel substituted. Adjustment of the saddle post and handle bars will compensate for the slight difference in the height of the pedal shaft from the ground.

Having described my invention what I claim and desire to secure by Letters Patent is:

1. A changeable speed gearing for pedal driven cycles comprising a closed gear case shaped to fit within the lower portion of the center framing of a cycle and having a plurality of cycle frame engaging supports and a removable top completely closing the case, a pedal shaft mounted within said case above its lower end and having its opposite ends extended beyond opposite sides of the case to receive the pedal arms, spaced toothed gears, of different diameters, fixed on said shaft to rotate therewith, a counter shaft journalled within said gear case above the pedal shaft and spaced toothed gears of different diameters mounted on said shaft to rotate therewith and for sliding movement thereon in opposite directions to mesh alternately with the spaced gears on said pedal drive shaft, a shifting lever mounted on and removable with the top of said case and connected to said sliding gears, a third gear fixed to said counter shaft and a sprocket shaft journalled in said casing and having one end extended from said casing to receive a sprocket wheel and having within the casing a gear fixed thereon and in permanent mesh with the third fixed gear of the counter shaft, said pedal, counter and sprocket shafts being mounted in said case above its lower end to permit a completely closed lubricant holding case.

2. A changeable speed gearing for pedal driven cycles comprising a closed gear case shaped to fit the lower portion of the center framing of a cycle having a removable top cover completely closing the top of the case and a gear shift lever journaled on said cover, said case being provided with a plurality of frame engaging supports, a changeable speed gearing completely housed within said case including a pedal shaft journaled in the case above its lower end carrying a plurality of rotating gears of different sizes, a counter shaft above said pedal shaft and similarly journaled carrying for rotation therewith and sliding movement thereon a plurality of differently sized speed varying gears meshing in different positions and ratios of transmitted speed, with the gears on said pedal shaft, and a sprocket wheel shaft journaled in the case having a gear fixed thereon cooperating with and receiving motion from said counter shaft and having one end extended beyond said case and mounting a sprocket gear, said pedal, counter and sprocket shafts being journaled in said case above its lower end to permit a completely closed lubricant holding case.

3. A changeable speed gearing for pedal driven cycles comprising a completely closed gear case of approximately triangular shape to fit the lower portion of the center framing of a cycle and having frame engaging supports and a removable top cover completely closing the gear case, and changeable speed gearing completely housed and journalled within said gear case, said gearing including pedal and sprocket wheel shafts housed within and journaled in the case but with ends projecting therefrom to receive pedal arms and sprocket wheel respectively, said shafts being journaled in said case above its lower end to provide a completely closed lubricant holding case.

4. A changeable speed gearing for pedal driven cycles comprising a completely closed gear case, shaped to fit the lower portion of the center framing of a cycle and having a removable top permitting the filling of the case interior with lubricant and a plurality of frame engaging supports, a changeable speed gearing completely housed within said gear case and including pedal and counter shafts having end bearings within said case completely accessible to the lubricant therewithin, said shafts being journaled in said case above its lower end to provide a completely closed lubricant holding case.

5. A changeable speed gearing for pedal driven cycles comprising a closed gear case provided with a removable top shaped to fit the lower portion of the central framing of a cycle and having a plurality of frame engaging supports, a changeable speed gearing housed within said case including a pedal shaft journaled in said case having a plurality of gears fixed thereon, a counter shaft similarly journaled having a plurality of speed varying gears slidably mounted thereon and cooperating with the pedal shaft gears, a sprocket wheel shaft journaled in said case and intergeared with said counter shaft, a shift lever having a ball seating in a socket formed in said removable top and having a shank extending downwardly therefrom to actuate said sliding gears on the counter shaft, and a shift lever detent plate having lever positioning notches therein and removably secured to said top over said ball of the shift lever to hold the same in its socket.

6. A changeable speed gearing for pedal driven cycles comprising a closed gear case shaped to fit the lower portion of the central framing of a cycle and housing, a changeable speed gearing including a counter shaft having sliding speed changing gears thereon, a shift lever mounted on and extending through said case to actuate said sliding gears, a lever detent plate mounted on said case having a slot therein for the shift lever and speed changed lever positioning notches at the ends of said slot, and a spring on the plate connected to the shift lever and operative to hold it in intermediate neutral position or in the speed changed positions predetermined by said notches.

WILLIAM A. TOLIVER.